United States Patent [19]

Flier

[11] Patent Number: 4,616,768

[45] Date of Patent: Oct. 14, 1986

[54] DISCHARGE BARRIER FOR COLLAPSIBLE TUBES

[75] Inventor: Gustav Flier, Rottenburg, Fed. Rep. of Germany

[73] Assignee: Lingner & Fischer GmbH, Bühl (Baden), Fed. Rep. of Germany

[21] Appl. No.: 616,048

[22] Filed: Jun. 1, 1984

[30] Foreign Application Priority Data

| Jun. 7, 1983 | [DE] | Fed. Rep. of Germany | 3320482 |
| Jul. 14, 1983 | [DE] | Fed. Rep. of Germany | 3327852 |
| Jul. 27, 1983 | [DE] | Fed. Rep. of Germany | 3327853 |
| Jan. 25, 1984 | [DE] | Fed. Rep. of Germany | 3402478 |

[51] Int. Cl.$^4$ .......................................... B65D 35/14
[52] U.S. Cl. .................................... 222/92; 222/213; 222/490; 137/512.15; 137/512.4; 137/844; 137/494
[58] Field of Search ............... 222/494, 490, 491, 92, 222/107, 564, 213, 495, 496; 137/512.15, 512.4, 844, 494

[56] References Cited

U.S. PATENT DOCUMENTS

| 1,122,868 | 12/1914 | Davis ................................... 222/92 |
| 1,859,397 | 5/1932 | Johnson et al. ..................... 222/490 |
| 2,661,126 | 12/1953 | Spencer .............................. 222/386 |
| 3,081,006 | 3/1963 | Land .................................. 222/212 |
| 3,179,299 | 4/1965 | Allegraud .......................... 222/207 |
| 3,669,323 | 6/1972 | Harker et al. ...................... 222/490 |
| 3,674,183 | 7/1972 | Venable et al. .................... 222/490 |
| 4,109,833 | 8/1978 | Gross ............................... 222/386.5 |
| 4,133,457 | 1/1979 | Klassen . |

FOREIGN PATENT DOCUMENTS

| 1924355 | 7/1965 | Fed. Rep. of Germany . |
| 1212862 | 3/1966 | Fed. Rep. of Germany . |
| 7223144 | 6/1972 | Fed. Rep. of Germany . |
| 2128875 | 12/1972 | Fed. Rep. of Germany . |
| 7241840 | 2/1973 | Fed. Rep. of Germany . |
| 2341934 | 3/1975 | Fed. Rep. of Germany . |
| 2704164 | 8/1978 | Fed. Rep. of Germany . |
| 1786644 | 12/1981 | Fed. Rep. of Germany . |
| 8230181 | 2/1983 | Fed. Rep. of Germany . |
| 1519814 | 2/1968 | France . |
| 2508008 | 6/1982 | France . |
| 724798 | 2/1955 | United Kingdom . |

Primary Examiner—Joseph J. Rolla
Assistant Examiner—Louise S. Heim
Attorney, Agent, or Firm—Spencer & Frank

[57] ABSTRACT

The invention relates to a container for flowable or otherwise extrudable materials, the container having a discharge barrier which comprises a dividing wall dividing the container space into an outer chamber which is in communication with a dispensing opening of the container and into a storage chamber in which the contents can be subjected to pressure for dispensing from the opening and can thereafter again be relieved of pressure. The dividing wall is formed with a membrane section having at least one valve opening which upon pressure loading of the membrane section from the side of the storage chamber opens against a restoring force exerted by a membrane mounting and which upon relief from pressure automatically closes again under the restoring force. The dividing wall is also formed with a holding element which is connected to the container in a manner that takes up manufacturing tolerances. Additionally, the dividing wall is formed with the mounting for its membrane section, the mounting being formed so as to be of relatively stable shape and being itself carried by the holding element. In the result, the mounting carries the membrane section in a manner largely uninfluenced by the connecting conditions between the holding element and the container.

49 Claims, 10 Drawing Figures

DISCHARGE BARRIER FOR COLLAPSIBLE TUBES

FIELD OF THE INVENTION

The invention relates to containers, particularly though not exclusively collapsible tubes, for flowable or otherwise extrudable materials, and to inserts therefor, and is more particularly concerned with a discharge barrier for such containers.

Such a discharge barrier serves mainly, upon dispensing of contents from the dispensing opening of a container, to prevent further flow of contents. Hence, such containers come into question, of which the contents are flowable or otherwise extrudable. Such contents can for example be liquid or semi liquid; but they can also for example be flowable powders and other contents with comparable properties. Application is preferably for freely flowing contents, e.g. adhesives, tooth paste or shampoo. Upon removal of liquid or semi liquid products from tubes, it is mostly unavoidable, e.g. because of the process of removal and the subsequent closing process, that a small air bubble becomes entrapped. If the contents of the tube contain a solvent, there is evaporation of solvent vapour into the air bubble. Generally an air, gas and/or vapour bubble can build up whose pressure corresponds to the sum of all component pressures of the volatile gas and vapour components within the tube. This pressure allows unwanted contents of the tube to flow out already upon opening of the tube, and then inconveniently allows further flow. The heat of the hand on using the tube as well as warm storage temperature sustain these processes. But unwanted discharge can also result from other causes, even if only gravity.

DISCUSSION OF THE PRIOR ART

The prior art shows that such outflow can be countered by dividing the container space into an outer chamber communicating with a dispensing opening of the container and an actual storage chamber by means of a dividing wall, which after dispensing of contents either wholly shuts off or at least throttles further flow of contents from the storage chamber into the outer chamber. If required one could even use the outer chamber as a dosaging chamber for contents to be quantitatively measured by the outer chamber. But the case to which the invention addresses itself predominantly is that the dispensing of contents depends upon the magnitude and duration of the dispensing pressure exerted on the contents present in the storage chamber and that a continuous column of the contents extends from the storage chamber through the outer chamber up into the dispensing opening. Upon removal of the operating pressure the means of communication provided in the dividing wall between the storage chamber and the outer chamber then impedes or prevents further delivery of contents from the storage chamber into the outer chamber to the dispensing opening.

The containers here of interest are preferably tubes (as already mentioned by way of example), in which dispensing of contents results from pressure upon the tube body. Apart from the usual collapsible tubes which are of primary concern, tubes are also of interest having a tube body which reverts back more or less elastically to a basic shape after the pressure has been exerted. But also other similarly acting containers come into question, e.g. those in which an actuating pressure is exerted on the storage chamber by way of an actuating piston, an actuating pneumatic pressure or other comparable pressure exerting actuating means.

If the outer chamber is not used as a dosaging chamber as previously mentioned, but if in devices of the kind referred to, the primary aim is to counter discharge or further flow of contents (which contents extend in a more or less closed column from the container opening through the outer chamber into the storage chamber), such throttling or wholly closing off the discharge barrier nevertheless has the character of a dosaging aid.

Within the framework of the invention the container opening can, for a special application, be permanently open if this does not lead to substantial deterioration of the contents during the period of use. Mostly the container opening is provided with a separate reusable closing means, e.g. in the case of tubes a conventional tube cap. In another, less preferred special application, the container opening can be provided with an automatic container closing means, e.g. a pressure actuated closing means for tubes and elastic containers according to German laid-open specification 27 04 164 or a tube closing means according to German laid-open specification 23 41 934. There are many other automatic tube closing means. Such automatic tube closing means which close the actual container opening when not in use, are not the subject of this invention.

The invention rather concerns itself with the form and arrangement of the dividing wall which divides an outer chamber which is in communication with the dispensing opening of the container from a storage chamber, in the function of the dividing wall of being partly or wholly a discharge barrier. The dispensing pressure here is transmitted, mostly by way of the contents itself, from the storage chamber by way of the dividing wall to the contents present in the outer chamber.

Particularly for use with an automatic tube closing means, but also otherwise, it is known (c.p. e.g. German petty patent 19 24 355 and German petty patent 72 23 144 and also British patent specification 724 798) to provide permanently open throttle openings in the dividing wall. Here however there is a conflict of aims between maximal unimpeded passage from the storage chamber to the outer chamber upon dispensing, and maximally powerful throttling during the time no dispensing takes place.

This conflict of aims no longer arises if the dividing wall is provided with a valve arrangement, particularly a one way valve arrangement from the storage chamber to the outer chamber, which upon pressure loading of the contents in the storage chamber opens an adequately large through-flow cross section, and upon removal of the dispensing pressure closes again, preferably fully or at least partially. The invention concerns itself more particularly with the range of problems of such dividing walls that have a valve arrangement and act as discharge barrier. It is here not excluded that a permanently free opening remains in the dividing wall in addition to the valve arrangement, in order to achieve e.g. pressure equalisation of different component pressures between storage chamber and outer chamber, of e.g. different solvent vapour pressures. Such an additional opening cross section is then however suitably formed with strong throttling action (German petty patent 82 30 181, claim 10).

Valve arrangements of a dividing wall can basically have any functionally suitable known valve structure. Here the invention concerns itself with the particular case where a more or less elastic automatic restoring force of the valve element depends on the manner of support of a membrane section which forms part of the dividing wall. Such known constructions fall into two categories. In one category (U.S. Pat. No. 3 081 006=German accepted specification 12 12 862, U.S. Pat. No. 3,179,299 and German patent specification 17 86 644) the dividing wall forms an integral part of the container body. In the other category (German petty patent 82 30 181 already mentioned and also German petty patent 72 41 840, U.S. Pat. No. 1,122,868 and French patent specification 1 519 814) the dividing wall is an insert later introduced into the container body. The invention is concerned primarily, though not exclusively, with the formation of the dividing wall as an insert. This insert can be connected to the container by loose abutment, e.g. abutment against a container shoulder under the pressure of the contents. However, more permanent connections are preferred, e.g. by clamping under prestressing or even by more permanent connection such as by means of adhesive. Of particular interest here is the possibility of clamping under prestressing, without thereby desiring to exclude the other kinds of connection.

There are many arrangements and forms of valve openings for the membrane section of the dividing wall that come into consideration. According to U.S. Pat. No. 3,179,299 the membrane section can have a plurality of small openings which distend upon pressure from the side of the storage chamber, in which the dividing wall prevents reverse flow of air from the outer chamber back into the storage chamber. The whole of the membrane section can serve as a flap valve (German patent specification 17 86 644). The membrane section can cooperate with a separate, e.g. flap style, valve element (U.S. Pat. No. 3,081,006=German published specification 12 12 862). Particularly, albeit not exclusively, the concerns of the invention are directed to such valve openings which are obtained simply by slitting of the membrane section.

The known arrangements of valve slits again fall into two categories. In the first category the valve slits are arranged centrally in the dividing wall e.g. as plain slit, Y-slit, crossed slit, angled slit or a circular slit interrupted along a short part of its periphery (German petty patents 72 41 840 and 82 30 181 and also French patent specification 1 519 814 and U.S. Pat. No. 1,122,868, FIGS. 1 to 4). In the second category the valve slits are arranged remote from the centre near the periphery of the membrane section (hereafter called "peripheral"), e.g. almost semi circular always for forming a valve flap (according to U.S. Pat. No. 1,122,868, FIG. 5). The invention concerns itself preferably, though not exclusively, with the second mentioned category.

Now, it has become apparent that especially in mass production with its great speed of manufacture, on the one hand the inserts which form the dividing wall with its membrane section, and on the other hand the containers, are affected by large manufacturing tolerances.

So, the invention is inter alia provided especially (though not exclusively) for aluminium tubes which currently are made at production speeds of 100 to 180 tubes per minute, mostly by extrusion presses where tolerances result for example from tool wear. The inserts that have the membrane section are appropriately manufactured from synthetic plastics, preferably of a kind inert to solvents (e.g. as used for adhesives) such as polypropylene or other functionally equivalent plastics. Here there are manufacturing tolerances both due to the injection tool as well as due to the properties of the material itself. Since the connection between dividing wall and container should be wholly or substantially sealed, the connection conditions between dividing wall and container can readily have undesired reactions on the opening of the valve. So, a holding element formed on the dividing wall which serves for connection to the container, e.g. by clamping, can exert undesired stresses on the membrane region that has the valve opening or valve openings, and thus influence the valve function in undesired manner. Comparable considerations apply even if the dividing wall is formed integrally with the container since even then tolerances of the container can have adverse effects on the valve opening in the membrane section of the dividing wall, which valve opening should be adjusted as accurately as possible.

The invention therefore has as its task to provide a container with a discharge barrier of the kind referred to which upon release from pressure acts preferably fully and in any case markedly upon the contents, which in a manner suited to mass production renders the suspension conditions of its valve opening or valve openings in the membrane section independent from the conditions of the connection of the dividing wall with the container. Here it is particularly desired to hold the membrane section free from stress so that the valve openings in the unstressed state are wholly closed or at any rate optimally closed. For special cases, if it is desired that the valve functions shall have particular desired stress conditions, consideration can be given to imparting these to the membrane section, and then these stress conditions should as far as possible be unaffected by the conditions of the connection between dividing wall and container.

This task is not posited or solved by the known state of the art.

SUMMARY OF THE INVENTION

Accordingly the invention provides a container for flowable or otherwise extrudable materials, the container having a discharge barrier which comprises a dividing wall dividing the container space into an outer chamber which is in communication with a dispensing opening of the container and into a storage chamber in which the contents can be subjected to pressure for dispensing from the opening and can thereafter again be relieved of pressure, wherein the dividing wall is formed with a membrane section having at least one valve opening which upon pressure loading of the membrane section from the side of the storage chamber opens against a restoring force exerted by a membrane mounting and which upon relief from pressure automatically closes again under the restoring force, and wherein the dividing wall is also formed with a holding element which is connected to the container in a manner that takes up manufacturing tolerances, and wherein the dividing wall is also formed with the mounting for its membrane section, the mounting being formed so as to be of relatively stable shape and being itself carried by the holding element, whereby the mounting carries the membrane section in manner largely uninfluenced by the connecting conditions between the holding element and the container.

In containers embodying the invention, the mounting of relatively stable shape of the membrane section, i.e. relative to the membrane section and appropriately also relative to the holding element of the dividing wall, sees to it that the membrane section has the desired stress conditions, preferably freedom from stress, independently of the conditions of the connection of dividing wall and container. The holding element which carries the mounting adapts itself to these conditions.

The discharge barrier according to French patent specification 1 519 814 for example is of the kind referred to. There, the holding element of the membrane section is a flat conical ring with strongly angled outer ring flange, where the two ring zones of the holding element clamp under the conical shoulder regions of a tube. The clamping stress is transmitted in the disc shaped central membrane section and hence influences the stress conditions in the central valve slit zone, since this is not, as in the case of the invention, mounted by a relatively stable shape. In containers embodying the invention such reaction is avoided. Corresponding considerations apply to the discharge barriers which are likewise of the kind referred to, namely according to German petty patent 72 41 840, German petty patent 82 30 181 and also U.S. Pat. No. 1,122,868 (discharge barriers of the kind referred to with dividing wall in the container formed as an insert), and also according to German patent specification 17 86 644, U.S. Pat. No. 3,179,299 or U.S. Pat. No. 3 081 006 = German published specification 12 12 862 (with a dividing wall integral with the container).

In particular cases it can be sufficient if the mounting does not surround the membrane shaped section of the dividing wall fully. Preferably however the mounting is formed as ring shaped. By "ring shaped" is intended in the first place a mounting extending all round without limitation to any particular shape, and in the second place, which is preferred, a shape of circular ring form. The form of a cylinder, or other form longitudinally extending in the axial direction of the mounting, has proved successful. By this means the stiffness of shape of the mounting, in the same material which forms the dividing wall and the more or less elastically yieldable/-deformable membrane section, can be brought about particularly well. Quite generally it is preferably provided that all elements of the dividing wall are formed monolithically from the same material, such as polypropylene already mentioned.

It would be possible to arrange the membrane section in a central region of the length of such longitudinally extending mounting, e.g. in the centre half way along. Such an arrangement can be useful in the case of a mounting of slight wall thickness to obtain maximum stiffness of shape. However it is preferred for ease of mass production and other reasons, to provide the membrane section at an end face of the mounting of longitudinally extending form. Among the other reasons can also be counted the particularly favourable elastic suspension of the membrane section, since here the membrane section is suspended in the manner of a drum covering. Although the mounting is here, as regards extended time periods, of stable shape, it can nevertheless simultaneously have sufficient elasticity so that it contributes to the determination of the elastic properties of the membrane section.

If with the dividing wall formed as an insert, it is in conventional manner disposed at a shoulder of the container as is commonplace (c.p. e.g. U.S. Pat. No. 1,122,868 or German petty patent 82 30 181), it is appropriate for the end face of a mounting of longitudinally extending form that has the membrane section, to be remote from the container shoulder.

Any element can serve as holding element that carries the mounting and is formed on the dividing wall, which compensates tolerances appearing at the container inner cross section occupied by the dividing wall, and in case that the dividing wall is formed as an insert also compensates tolerances of the insert. In strictness the holding elements can even form part of the mounting, insofar as this is in the position to fulfil the mounting function as well as the tolerance compensating holding function. Normally, the holding element is a distinct element.

In order that the holding element of a dividing wall serving as insert, shall have a clamping action, the holding element is appropriately formed as a circular collar. This can suitably be an annulus with an angled holding flange. For the already mentioned common case whereby the insert abuts against a container shoulder and this container shoulder is of inclined form in the manner of a tube shoulder, it is preferred to provide that the annulus is also of inclined form in conformity with the inclined container shoulder. So as to be able to arrange the holding element close against the container shoulder, it is further appropriately provided that the holding flange points away from the relevant container shoulder. Finally, if it be desired to form the parts of the holding element with relatively thick walls, and yet provide for elastic conformation of differing inner cross sections to take up tolerances of the container, an appropriate elastically yieldable ring zone can be provided in the holding element. This can be obtained by weakening of the material in an elastically yieldable base material of the dividing wall. Here a preferred embodiment is that in which the inner transition surface of the annulus to the holding flange extends angled from radially inwards to radially outwards and forms a ring shaped weakened zone.

In order to make use of the even stress condition of the membrane section, basically the valve opening or the plurality of valve openings can be formed and arranged in any desired known manner. Of particular interest within the framework of the invention is here the provision of peripheral valve slits. Hitherto one has merely so formed a pair of opposite peripheral slits disposed as circular sections with an extent of less than 180°, that a flap in the shape of a segment of a circle can flap about the line connecting the ends of the respective circular section. This flap operation requires a relatively thick walled construction of the region of the membrane section disposed radially further inwards, if one wants to produce appreciable restoring forces. It is also to be recognised as a drawback that the hinge line of the flap is disposed in the radially inner region of the membrane section which is more likely to be elastic. Quite generally, the ability of such a membrane flap for long term holding is limited.

According to a subsidiary feature of the invention there is instead preferably provided that at least one, preferably a plurality, of peripheral valve slit(s) extends or extend along the mounting. By extending along the mounting it is ensured that the region of the respective valve slit neighbouring on the mounting is held more or less stationary, whereas the radially inwardly disposed edge of the valve slit can slide upon deformation of the unslit edge zone of the membrane section in axial direction of the mounting in the member of a valve slider.

If a radius of the membrane section can be defined, which is the case with the usual round or oval or similar configurations, the respective valve slit extends or the respective valve slits extend appropriately perpendicularly with respect to the radius of the membrane section. From this it follows that for the above mentioned preferred case, in which the respective valve slit extends along the mounting, that the mounting also extends wholly or substantially circumferentially.

This not only avoids the disadvantages of the known flap like slit configurations but also the disadvantages of radial value slits. Trials with radially slit valve membranes of elastic material, disposed in edge tight manner in tubes before their respective tube cone, show that such valve membranes only relatively insufficiently enable dosaging and only relatively insufficiently prevent further flow. The reason lies in less sufficient restoring spring action of valve membranes constructed in this manner, particularly if the dividing walls are produced as cost effective injection mouldings of a solvent resistant plastics as e.g. polypropylene for holding adhesives. With the abovementioned configuration embodying the invention, with a respective valve slit peripherally extending along the mounting perpendicularly to a radius, there is brought about, as against the foregoing, a restoring spring action from the mounting as carrier of the membrane section, to ensure rapid opening and closing of the valve slit, which it is necessary to provide for exact dosaging and to prevent further flow. In contrast to radially slit membranes which at the same time assume a function similar to valve flaps, the counterpressure membrane, which is closed up to its periphery and if appropriate reinforced at the centre, assumes within the framework of the invention the function of a valve slider, which exactly for a given counter pressure lets the valve slits open slightly and lets these close again immediately upon relaxation of the pressure. Here the mounting contributes to the result that the closing and opening processes are largely independent of any prestressing between a holding element e.g. formed as a tube insert holding collar, and the container here the tube. Such prestressing of the holding element is necessary for secure holding in transport and storage if the dividing wall is formed as a tube insert in the tube, without there being any desire at all for any such prestressing in the region of the valve openings, here the specially formed and arranged valve slits.

In order to introduce such a tube insert into a tube without damage to the latter, introduction of the tube insert is suitably effected at an inclination to the tube diametral plane, and the tube insert is only pressed tight against the container shoulder at the front tube cone, level against the latter.

It is not necessary for the membrane section to form a counter pressure membrane of constant thickness. Thus, the membrane section can form a stiffening rib extending towards the respective valve slit, appropriately extending radially. The like applies to a plurality of stiffening ribs. Also the membrane section can be formed reinforced towards its centre. Here the reinforcement can be formed on the stiffening rib or stiffening ribs. For control of the valve opening(s) it is here appropriate if the stiffening rib or the stiffening ribs and/or the reinforcement are formed on the side remote from the storage chamber.

To improve the restoring spring action of the membrane section, i.e. the valve sliding action of the dosage slit in the mentioned preferred peripheral arrangement, the counter pressure membrane can be connected directly to the mounting in asymetric position only along a short part of its periphery and connected along the remainder of its periphery to the mounting by way of a bellows like formation. This results in that the counter pressure membrane formed by the membrane section carries out a tilting movement in the presence of pressure transmitted by the tube contents with the tube open, namely a tilting movement in the direction of the tube opening, whose axis of rotation is in the short direct connecting part between the mounting and the counter pressure membrane. Consequently the dosage slit which is positioned in that part opens a little, and upon relaxation of the pressure immediately and reliably closes again.

The aforementioned valve sliding action already appears in marked measure if the abovementioned preferred peripheral valve slit or respective valve slits which appropriately extends along the mounting and concentrically of the membrane section, is or are spaced somewhat from the mounting. Also even then, the inner lying regions of the membrane section move with valve-sliding action in the axial direction of the membrane section further than the remaining peripheral sections which are held fast by the mounting. An optimal valve sliding action is obtained if several such peripheral slits are evenly distributed along the mounting. But even with a single valve slit a similar action is already obtained.

One can reinforce this effect if the outer edge of the relevant valve slit or valve slits is arranged at the inner edge of the mounting, since then the outer edge of the relevant valve slit no longer bends outwards relative to the mounting and thereby the valve sliding action of the relevant region of the membrane section that is connected with the inner edge of the relevant valve slit is optimised.

The control of opening of the valve slit can then be improved further if the plane of incision of the valve slit or of the relevant valve slits extends inclined with respect to the axis of the mounting. It is best for the deformation movement if the plane of incision has an angle of inclination in the direction of the centre of the tube insert, so that the respective valve slit at the side of the membrane section that faces the outer chamber is further from the axis that at the side of the membrane section that faces the storage chamber.

BRIEF DESCRIPTION OF THE DRAWINGS

The invention will now be described, by way of example only, with reference to several preferred embodiments thereof, shown in the accompanying drawings, wherein:

FIG. 4b shows a discharge barrier in front elevation, modified as compared to FIG. 2 and FIG. 3b, in particular with basic arrangement according to FIG. 3a;

DESCRIPTION OF THE PREFERRED EMBODIMENTS

Figure 1:
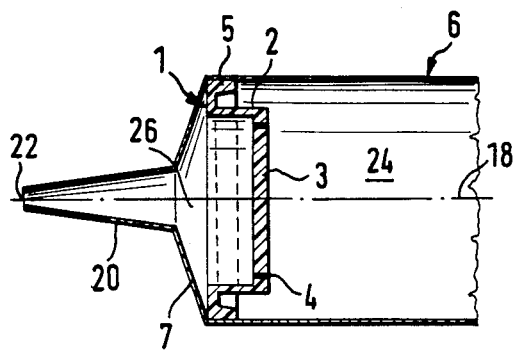
FIG. 1 is a cross section containing the tube axis through the front part of a tube, shown broken away, with a built-in discharge barrier.

A tube 6, more particularly a collapsible tube, is shown by way of container for all the embodiments, without prejudice to the generality. More particularly it relates to an aluminium tube. This has a main body 14 which in the uncollapsed state is cylindrical, but which in a modified form, not shown, can be of flattened shape ab-initio. The main body 14 is in known manner closable at one end, for example by a closure fold, which is not itself shown. At its front end the main body 14 is joined by way of a conical transition member 16 to a nozzle 20 which is coaxial with the axis 18 of the main body 14. The nozzle 20 is gently tapered in the manner of a spout and at its front end has the dispensing opening 22 of the container. The dispensing opening 22 can be closed in known manner, not shown, by its own closure member, more particularly by a closure cap which can be slipped or screwed onto the nozzle 20. The conical transition member 16 is also coaxial with the axis 18, which thus is also the container axis, and forms a container shoulder 7 connected to the front of the main container 14 closing it off at the front as far as the transition to the nozzle 20 and encloses an acute angle of e.g. 27° with the cross section of the main body 14.

There is a dividing element or dividing wall 1 in the region of this cross section at the end face of the main body 14, and hence also in abutment with the junction point between the container shoulder 7 and the main body 14. The dividing wall 1 is in the form of an insert made of material, such as polypropylene, inert to solvents, the dividing wall 1 being slid into the main body from the back up into abutment with the junction with the container shoulder 7. The dividing wall 1 subdivides the container space into a storage chamber 24 which corresponds substantially to the inner space of the main body 14, and an outer chamber 26 which is bounded at the back by the dividing wall 1 and at the front by the dispensing opening 22.

To introduce the tube insert, which forms the dividing wall 1, into the tube 6 without damage to the latter, the introduction of the tube insert into the tube is effected while the latter is still open at the back, at an inclination to the then diametral plane of the tube. The tube insert is first pressed against the conical transition member 16 level with the transition of the main body 14 into the container shoulder 7 formed by the conical transition member 16, and in the consequently resulting level position connected in sealing tight manner with the cross sectional surface at the end face of the main body 14 of the tube 6.

The dividing wall 1 has at least one valve opening 4 which opens when the dividing wall 1 is subjected to pressure from the side of the storage chamber and closes again automatically upon release of the pressure. This actuating pressure upon the respective valve opening 4 is exerted by the fluid contents contained in the storage chamber 24 when external finger pressure is applied to squeeze the main body 14 for dispensing the contents. Then, even if the main body 14 remains in squeezed together condition, the opening pressure upon the valve opening 4 drops as soon as a sufficient quantity of the contents has passed through the respective valve opening 4 into the outer chamber 26 for dispensing of contents. Thus the respective valve opening 4 operates as a check valve which automatically reverts to the closed position, preferably fully but in any case appreciably so. In all the depicted embodiments the valve opening 4 is always formed as a valve slit within a central elastically deformable flexible partition or membrane region 3 of the dividing wall 1. In the case of a relatively soft membrane section 3 the slit can be relatively short, in the case of a relatively hard membrane section 3 it should be somewhat longer. The slit length also depends on whether the fluid contents are free flowing or viscid. In the case of contents flowing freely like water, slit lengths of 2 to 3 mm suffice; in the case of more viscid contents suitably longer slit lengths are adopted. As is further pointed out, the slit direction and other slit arrangement should be selected such that flap like opening of an edge portion of the valve slit or of both edge portions should be avoided as far as possible. For like reasoning the length of the valve slit should in general not become too great. If e.g. the valve slit extends along a strongly curved or long less strongly curved curve, flap operation of the membrane region forming the inner edge of the slit can in practice scarcely be avoided. These reflections with regard to preferred valve slits however do not exclude that the dividing wall can be provided with other known forms of valve openings or several of such.

The entire dividing wall 1 is appropriately formed monolithically of the same plastics material. Separate radially neighbouring sections are then of differing material thicknesses and/or shapes and hence are elastically deformable to differing extent.

The radially innermost zone here forms the membrane section 3 which is suspended by a mounting 2 surrounding it at its outer perimeter, at least substantially free and so far as possible wholly free from stress. The outer periphery of the membrane section 3 is then suitably circular, but can also e.g. in the case of a main body 14 of flattened shape, form a different outline, e.g. with flattening like the main body or also of other shape than the main body in accordance with considerations determined by the way it is supported. In a borderline case the frame need not extend around the entirety of the membrane section.

In the case of all embodiments, the mounting 2 is formed as a cylinder coaxial with the axis 18 and the membrane section 3 is supported from the end face of the mounting 2 which faces the storage chamber 24. As can be seen from the representations and in paricular from FIG. 5, the wall thickness of the cylinder 2 need not be at all greater than that of the membrane section 3, since the cylidrical form of the mounting lends additional stability to the shape.

The front end face of the cylinder 2 remote from the membrane section 3 extends up to the cross sectional surface at the front end face of the main body 14. From there a circular collar 5 serving as holding element extends radially outwards. This circular collar 5 is elastically yieldable in the radial direction to such extent that it can always elastically yieldably bear against the container inner wall, here that of the main body 14, even if there are manufacturing tolerances in the inner cross sectional region of the tube 6 taken up by the holding element. At the same time this elastic yieldability in the radial direction permits diametral tolerances of the insert body itself, which forms the dividing wall 1, to be compensated. Hence there is a seal even in the case of relatively large tolerances, always in the presence of friction adequate for sealing between holding element and container inner wall.

The cylinder 2 appropriately has an outer diameter amounting to about three-quarters of the diameter of the main body 14. The remaining radial extent of the dividing wall is taken up by the holding element 5. As appears more particularly from FIG. 5, it is suitable for the axial length of the cylinder 2 to be about the same as the radial extent of the holding element 5. The respective valve slit 4 extends in all the depicted embodiments as a circular arc coaxial with the axis 18 parallel to the boundary surface of the cylinder 2 in the neighbouring region to its inner surface. Hence each depicted valve slit 4 extends strictly perpendicularly to the radii r of the respective membrane sections 3 or of the whole of the dividing wall 1.

This arrangement of the respective valve slit 4 has the consequence that upon pressure loading of the dividing wall 1 from the side of the storage chamber 24 the edge of the valve slit 4 to the side of the mounting 2 remains fully or substantially static, whereas the edge of the valve slit connected with the central region of the membrane section 2 slides a little in the manner of a slide valve approximately lengthwise of the axis 18, namely under elastically yieldable deformation of the peripheral zone of the membrane section which is in continuation of the respective valve slit. Because of the only relatively slight curvature of the respective valve slit 4 and also its only relatively slight length there cannot be any substantial flap action of the radially inner edge region of the valve slit about the chord which connects the two ends of the respective valve slit with each other. It will be understood that similar effects can be obtained for example by a modification, not shown, in which a short valve slit is of straight form and stands bisected along its length perpendicularly by a central radius of the membrane section. Further equivalent configurations can be conceived, for example with a straight valve slit and in its region a straight parallel shape of the mounting 2.

The circular collar 5 which forms the holding element basically has an annulus 28 which extends from the end face of the cylinder 2 facing the outer chamber 26, and at its radially outer edge merges into a holding flange 30 rearwardly extending longitudinally with respect to the cylinder 2.

Whereas the features set forth so far are common to all the depicted embodiments, these differ from each other as follows.

Figure 3A:
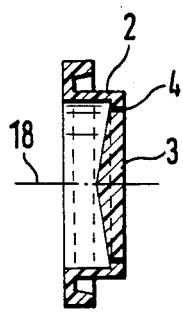
FIG. 3a is a cross section corresponding to the section plane of FIG. 1 through a modified discharge barrier.
Figure 4A:
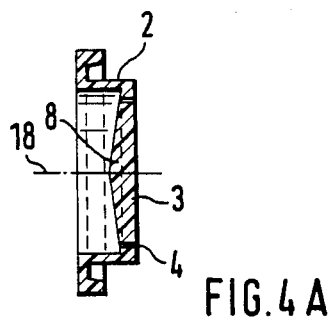
FIG. 4a is a cross section corresponding to the section plane of FIG. 1 through a further discharge barrier.
Figure 5:
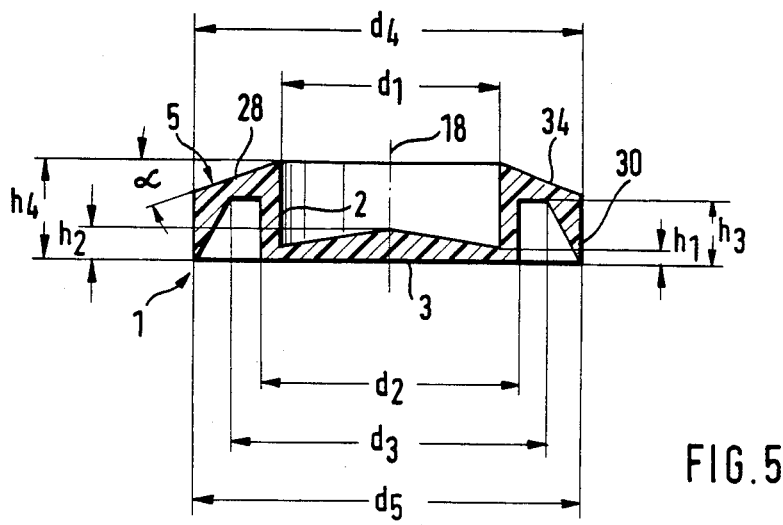
FIG. 5 is a cross section corresponding to the section plane of FIG. 1 on an enlarged scale through a discharge barrier, omitting the valve opening(s), particularly according to FIG. 3a or FIG. 3b.
Figure 6:
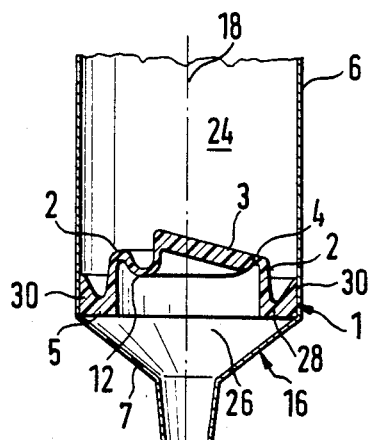
FIG. 6 is a cross section, of a modified embodiment, taken in the section plane of FIG. 1, through the front part of a tube, shown broken away, with built-in discharge barrier.
Figure 7:
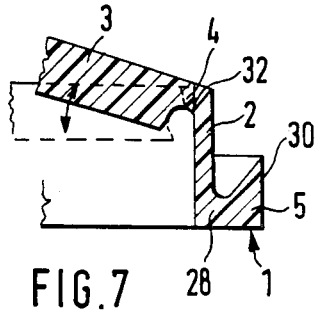
FIG. 7 is a partial cross section, to an enlarged scale, of the discharge barrier of FIG. 6, with hatching indicating the position of rest and indicating in broken line the dispensing position of the membrane section of the discharge barrier.
Figure 8:
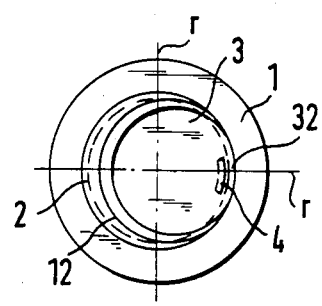
FIG. 8 shows in front elevation the discharge barrier of FIGS. 6 and 7.
Figure 9:
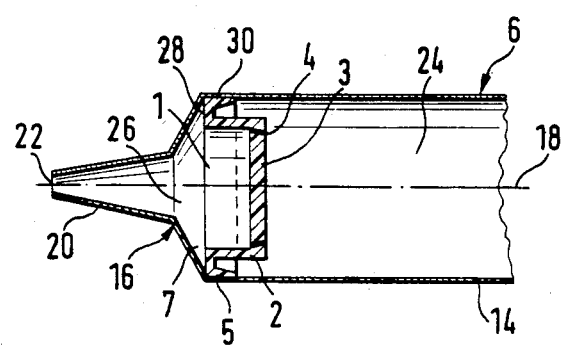
FIG. 9 is a cross section corresponding to the section plane of FIG. 1 through the front part of a tube shown broken away, with yet another form of built-in discharge barrier.
Figure 10:
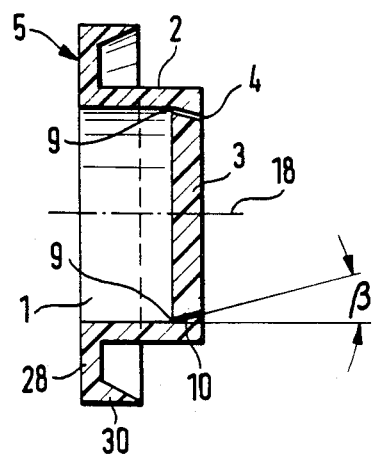
FIG. 10 shows the cross section of the discharge barrier of FIG. 9 to an enlarged scale.

Except for the embodiments of FIGS. 6 to 8, the membrane section 3 in all the other embodiments is so positioned that its end face proximate to the storage chamber 24 when in unstressed condition lies flat in the rear end face of the cylinder 2. As shown by the embodiments of FIGS. 1, 9 and 10, the end face of the membrane section 3 proximate to the outer chamber 26 can then also be flat and parallel to the other end face, so that the membrane section 3 forms a flat membrane of constant thickness. However, as shown by FIGS. 3a, 4a and 5, the end face of the membrane section 3 proximate to the outer chamber 26 can be reinforced towards its centre. In the depicted embodiments the contour of the reinforcement extends along a straight cone, which reinforces the membrane section 3 at its central point with respect to its circumference by a factor of about two to three, preferably by a factor of 1.5. This reinforcement can then according to FIG. 3a be formed so as to be of constant angle, or according to FIGS. 4a and 4b only with one or more reinforcement or stiffening rib(s) 8. If such rib 8 is used it is suitable that it should extend from the axis to the respective valve slit 4, namely symmetrically with respect to the central radius of the latter. In the case of two diametrically opposite valve slits 4 as in FIG. 4b, the two ribs 8 then together form a rib extending along a diameter of the membrane section 3.

Figure 4B:
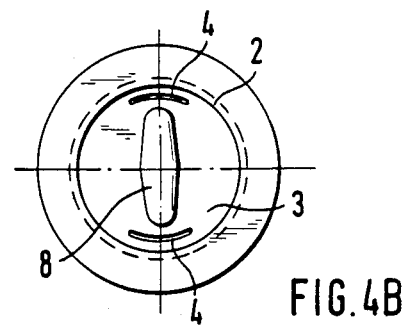

The reinforcement can then start already at the inner surface of the cylinder 2 as shown by FIGS. 3a and 4a; but it can also start radially further inwards, and depending on circumstances, only spaced a little further radially inwards than the respective valve slit 4 as shown by the modification of FIG. 4b. It is here appropriate to avoid sharp edges or corners in the boundary regions of the ribs, so that a rib shape of oval outline lengthwise extending along a radius according to FIG. 4b is appropriate.

Figure 2:
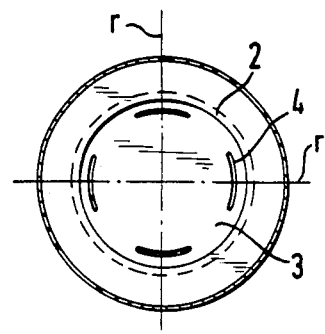
FIG. 2 shows a discharge barrier in front elevation, particularly for the arrangement of FIG. 1.
Figure 3B:
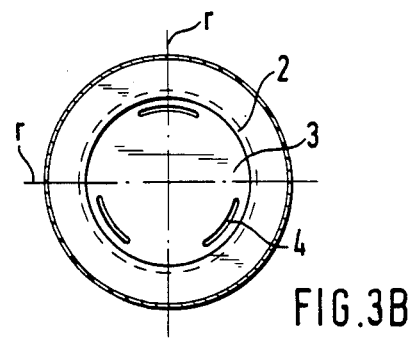
FIG. 3b shows a discharge barrier in front elevation, corresponding to FIG. 3a and modified as compared to FIG. 2.

Without prejudice to the generality, it is possible to provide just a single valve slit 4, as shown in the embodiment of FIGS. 6 to 8 in conjunction with a yet to be described further feature. But also there can be provided two (FIG. 2), three (FIG. 3b) or four (FIG. 4b) valve slits 4, which are appropriately distributed in even spacing about the periphery of the membrane section 3 as shown. Also a larger number of valve slits is possible; the more valve slits are provided, the more coaxial with the axis 18 is the movement of the central region of the membrane section 3, which forms the respective inner edge of the valve slits 4, upon pressure loading from the side of the storage chamber 24, in the manner of a valve slider, relatively to the respective radially outer edge of the valve slit. On the other hand, the number of valve slits 4 appropriate to be used, depends on the measure of the desired restoring force which is to act in the material in the outer region of the membrane section complementary to the valve slits 4.

In the embodiments of FIGS. 1 to 8, the respective valve slit 4 is at a slight radial spacing with respect to the inner surface of the cylinder 2. This spacing is small, preferably very small, compared to the radius of the membrane section 3. As shown, this spacing can be smaller by one order of magnitude than the radius of the membrane section 3. Practical values are about 0.1 to 0.2 fold, for example 0.15 fold as shown. Preferably however, as shown in FIGS. 9 and 10, the valve slit 4 concides fully or substantially with the inner surface of the cylinder 2. This is illustrated in FIGS. 9 and 10 in embodiments which can be according to FIG. 2 or FIG. 4b in which respectively a pair of valve slits 4 are diametrically opposed. Additionally, the particularly advantageous feature is shown whereby the incision planes 10 of the valve slits 4 show a straight angle of inclination $\beta$ such that the incision plane 10 at its end facing the outer chamber 26 coincides with the inner edge i.e. the inner surface of the cylinder 2, and in the direction of the storage chamber 24 extends conically towards the axis 18. This is shown in FIGS. 9 and 10 without prejudice to the generality, in relation to a membrane section 3 of constant thickness, so that a corresponding configuration can also be combined with reinforced membrane sections, such as according to FIGS. 3a and 4a or also 4b, or others. It will also be understood that this inclined slit direction is not limited to diametrically opposed valve slits 4.

In FIG. 10 the angle of inclination $\beta$ is measured with respect to the inner surface of the cylinder 2. If the incision plane 10 were extended in the direction of the storage chamber to a point of intersection with the axis 18, the angle of intersection is $90° - \beta$. $\beta$ itself is an acute angle of appropriately more than 10° and less than 40°, preferably about 30°.

Instead of arranging the membrane section 3 in the end face of the cylinder 2 which faces the storage chamber 24, it is only necessary for the central section 3, appropriately formed as a flat cylindrical disc, to be directly connected to the cylinder at the end face of the cylinder 2 proximate to the storage chamber only along a short part of the periphery to both sides of a single valve slit 4, and to be connected along the rest of its periphery by way of a bellows like formation 12 with the end of the cylinder 2 facing the storage chamber 24. A short direct connecting part 32 between the membrane section 3 and the cylinder here serves as a hinge about which the itself flap like membrane section can be swung, under elastic deformation of the bellows like formation which is turned outwards in the direction of the outer chamber 26. In the normal position devoid of pressure loading, the membrane section is in the position shown by unbroken lines and hatched in FIG. 6 and FIG. 7, whereas when it is pressure loaded from the side of the storage chamber 24 it can be swung upon opening of the valve slit 4 into the position indicated in FIG. 7 by broken lines, in which the side of the membrane section 3 proximate to the storage chamber 24 can be swung up into the cross sectional surface at the end face of the cylinder 2 proximate to the storage chamber 24. It is not necessary for this position indicated in broken lines to be reached; what is important is the splaying open of the valve slit 4 resulting from the relative swinging movement and without flapping movement of a valve slit edge. As the bellows like formation 12 can store a relatively large restoring force, this at the same time provides for certain closure of the valve slit 4 after release of the pressure. This results in a particularly good spring back capacity for the valve arrangement to operate as an automatic check valve. It will be understood that many modifications of the described embodiment are possible, as for example a different contour or other profiling of the membrane section 3 or also the provision of several valve slits in the hinge region.

Also in the embodiment of FIGS. 6 to 8 the opening movement of the valve slit 4 is effected rather in the manner of a valve slider, than in the sense of such flap movement in which an edge of the valve slit itself flaps open about a swing axis within the conterpressure membrane formed by the membrane section 3.

The holding element 5, in all the embodiments shown except that of FIG. 5, has an annulus 28 which extends in and is level with the cross sectional surface at the end face of the cylinder 2 facing the outer chamber 26. The holding flange 30 which extends away from the shoulder 7 and of which the outer surface abuts the inner surface of the main body 14 with friction grip, has an axial length about half that of the cylinder 2, at least such length as to give reliable support and sealing. The holding flange 30 can here be of approximately triangular pointed (FIGS. 7, 9 and 10) or blunt (FIGS. 1, 3a and 4a) cross section, in which the base of the triangle faces the cylinder 2, one side of the triangle abuts the inner wall of the container and the other side of the triangle coincides with the side of the annulus 28 facing the shoulder 7.

FIG. 5 shows another embodiment of the holding element 5. In this embodiment the side of the annulus facing the container shoulder 7 is chamfered at an angle $\alpha$ so that the entire side of the insert which forms the dividing wall 1 can come into close abutment with the correspondingly angled container shoulder 7. Since the side of the annulus 28 that faces the storage chamber 24 still extends radially, a ring zone 34 of narrowed thickness results at the contact region of the holding flange 30 from whence the pointed triangular holding flange 30 extends. In this way the tolerance compensating elasticity of the holding element 5 can be obtained particularly well and at the same time secure abutment of the insert against the container shoulder.

Some typical measurements of such an insert forming the dividing wall are given with reference to FIG. 5.

Inner diameter $d_1$ of the cylinder 2 = 19.5 mm;
Outer diameter $d_2$ of the cylinder 2 = 20.5 mm;
Diameter $d_3$ of the ring zone 34 = 22.0 mm;
Outer diameter $d_4$ of the annulus 28 = 24.5 mm;
Outer diameter $d_5$ of the edge of the support flange 30 facing the storage chamber 24 = $24.8_{-0}^{+0.1}$ mm;
Thickness $h_1$ of the membrane section 3 at its weakest part = 0.4 mm;
Thickness $h_2$ of the membrane section 3 in its thickest part = 1.0 mm;
Height $h_3$ of the outer surface of the holding flange 30 which is in friction grip engagement with the inner surface of the main body 14 = 3.0 mm;
Height $h_4$ of the cylinder 2 between its two end faces = 4.7 mm;
Chamfer angle $\alpha$ of the side of the annulus 28 facing the container shoulder 7 and
corresponding to the inclination of the container shoulder 7 itself = 27°.

The insert depicted in FIG. 5 is the not yet slit blank, suitably of soft polypropylene. The tolerance compensating effect of the holding element 5 can be recognised in the slightly differing measurements $d_4$ and $d_5$ taken together with the elastically yieldable properties of the material, without adverse effect upon the predicated requirements for supporting the membrane section 3 in the mounting formed by the cylinder 2.

It can be seen further that the inner transition surface between the annulus 28 and the holding flange 30 extends angled from radially inwards to radially outwards and forms a ring shaped weakened zone 34 in the side facing the storage chamber 24. The holding flange here extends up into the plane of the membrane section 3 facing the storage chamber 24.

It follows from the exposition given of the different embodiments that the different features can be freely combined, within the realms of what is possible. Particular special correlations can be seen from the listing of the figures.

What I claim is:

1. Container for extrudable including flowable materials, comprising:
a container body having a container space within the container body, having a dispensing opening for dispensing contents from the container, and having an inclined container shoulder, the container body being such that the contents thereof can be subjected to pressure for dispensing from the opening and can thereafter again be relieved of pressure; and
dividing element means, constituting a discharge barrier, for countering unwanted discharge from the container body, the dividing element means being disposed in the container space adjacent the container shoulder and separating the container space into a storage chamber and an outer chamber which is in communication with the dispensing opening, the dividing element means including
a mounting element having a sleeve-like shape, outwardly flared holding element means, forcefit into the container body, for securing the mounting element to the container body despite dimensional deviations in the container body arising from manufacturing tolerances, the holding element means being formed as a ring collar which comprises an annulus with an angled holding flange, the annulus having a surface which is proximate to the outer chamber and which is formed with an inclination conforming to the inclination of the shoulder, and
a flexible partition attached to the mounting element and having at least one valve opening which upon pressure loading of the partition from the side of the storage chamber opens against a restoring force exerted by the mounting element and which upon relief from pressure automatically closes again under the restoring force, the partition being isolated from stress between the holding element means and the container body by the mounting element.

2. Container according to claim 1, wherein the mounting element is ring shaped.

3. Container according to claim 2, wherein the mounting element is cylindrical.

4. Container according to claim 1, wherein the mounting element is elongate and has an end face, the partition being attached at the end face of the mounting element.

5. Container according to claim 4, wherein the said end face of the mounting element is remote from the container shoulder.

6. Container according to claim 1, wherein the holding flange extends away from the container shoulder.

7. Container according to claim 1, wherein the holding element means has an inner transition surface between the annulus and the holding flange, and the said transition surface extends angled from radially inwards to radially outwards and forms a ring shaped weakened zone.

8. Container according to claim 1, wherein each said at least one valve opening is a respective peripheral valve slit extending adjacent the mounting element.

9. Container according to claim 8, wherein each at least one valve slit extends perpendicularly with respect to the radius of the partition.

10. Container according to claim 9, wherein the partition comprises a stiffening rib extending towards each at least one valve slit.

11. Container according to claim 10, wherein each stiffening rib extends radially.

12. Container according to claim 1, wherein the partition comprises a reinforcement towards its centre.

13. Container according to claim 11, wherein the partition comprises a reinforcement towards its centre and said reinforcement is formed by at least one stiffening rib.

14. Container according to claim 11, wherein each stiffening rib is formed on the side of the partition remote from the storage chamber.

15. Container according to claim 12, wherein the reinforcement is formed on the side of the partition remote from the storage chamber.

16. Container according to claim 8, wherein the sleeve-like shape of the mounting element includes a bellows like formation, wherein the partition is directly connected to the bellows like formation except along a relatively short peripheral section, and wherein each at least one valve slit is disposed only in the region of said relatively short peripheral section.

17. Container according to claim 8, wherein the outer edge of each at least one valve slit is disposed at the inner edge of the mounting element.

18. Container according to claim 8, wherein the mounting element has an axis, and wherein the plane of incision of each at least one valve slit is inclined with respect to the axis.

19. Container according to claim 18, wherein the said inclination is such that each at least one valve slit is further from the axis at the side of the partition proximate to the outer chamber than it is at the side of the partition proximate to the storage chamber.

20. Container according to claim 1, the container body being a collapsible tube for dispensing of its contents by the application of finger pressure to the walls of the tube.

21. Container according to claim 1, wherein the container is filled with flowable or otherwise extrudable material.

22. Container according to claim 21, wherein the fill in the container is adhesives.

23. Container according to claim 21, wherein the fill in the container is shampoo.

24. Container according to claim 21, wherein the fill in the container is tooth paste.

25. Insert for a container according to claim 1, the insert being adapted to constitute the dividing element means for the container body.

26. Container for extrudable including flowable materials, comprising:
a container body having a container space within the container body and having a dispensing opening for dispensing contents from the container, the container body being such that the contents thereof can be subjected to pressure for dispensing from the dispensing opening and can thereafter again be relieved of pressure; and dividing element means, constituting a discharge barrier, for countering unwanted discharge from the container body, the dividing element means being disposed in the container space and separating the container space into a storage chamber and an outer chamber which is in communication with the dispensing opening, the dividing element means including a mounting element having a sleeve-like shape, outwardly flared holding element means, forcefit into the container body, for securing the mounting element to the container body despite dimensional variations in the container body arising from manufacturing tolerances, the holding element means being formed as a ring collar which comprises an annulus with an angled holding flange and which has an inner transition surface between the annulus and the holding flange, the inner transition surface extending angled from radially inwards to radially outwards and forming a ring shaped weakened zone, and a flexible partition attached to the mounting element and having at least one valve opening which under pressure loading of the partition from the side of the storage chamber opens against a restoring force exerted by the mounting element means and which upon relief from pressure automatically closes again under the restoring force, the partition being isolated from stress between the container body and the holding element means by the mounting element.

27. Container according to claim 26, wherein the mounting element is ring-shaped.

28. Container according to claim 27, wherein the mounting element is cylindrical.

29. Container according to claim 26, wherein the mounting element is elongate and has an end face, the partition being attached at the end face of the mounting.

30. Container according to claim 29, wherein the container body comprises a container shoulder, the mounting element has an end face at which the partition is attached, the dividing element means is disposed at the container shoulder, and the end face of the mounting element is remote from the container shoulder.

31. Container according to claim 26, wherein the container body includes a container shoulder adjacent which the holding element means is disposed, the holding flange extending away from the container shoulder.

32. Container according to claim 26, wherein each said at least one valve opening is a respective peripheral valve slit extending adjacent the mounting element.

33. Container according to claim 32, wherein each at least one valve slit extends perpendicularly with respect to the radius of the partition.

34. Container according to claim 33, wherein the partition comprises a stiffening rib extending towards each at least one valve slit.

35. Container according to claim 34, wherein each stiffening rib extends radially.

36. Container according to claim 26, wherein the partition comprises a reinforcement towards its centre.

37. Container according to claim 35, wherein the partition comprises a reinforcement towards its centre and said reinforcement is formed by at least one stiffening rib.

38. Container according to claim 35, wherein each stiffening rib is formed on the side of the partition remote from the storage chamber.

39. Container according to claim 36, wherein the reinforcement is formed on the side of the partition remote from the storage chamber.

40. Container according to claim 32, wherein the sleeve-like shape of the mounting element includes a bellows like formation, wherein the partition is directly connected to the bellows like formation except along a relatively short peripheral section, and wherein each at least one valve slit is disposed only in the region of said relatively short peripheral section.

41. Container according to claim 32, wherein the outer edge of each at least one valve slit is disposed at the inner edge of the mounting element.

42. Container according to claim 32, wherein the mounting element has an axis, and wherein the plane of incision of each at least one valve slit is inclined with respect to the axis.

43. Container according to claim 42, wherein the said inclination is such that each at least one valve slit is further from the axis at the side of the partition proximate to the outer chamber than it is at the side of the partition proximate to the storage chamber.

44. Container for extrudable including flowable materials, comprising:

a container body having a container space within the container body and having a dispensing opening for dispensing contents from the container, the container body being such that the contents thereof can be subjected to pressure for dispensing from the dispensing opening and can thereafter again be relieved of pressure; and dividing element means, constituting a discharge barrier, for countering unwanted discharge from the container body, the dividing element means being disposed in the container space and separating the container space into a storage chamber and an outer chamber which is in communication with the dispensing opening, the dividing element means including a mounting element having a first portion with a sleeve-like shape and a second portion with a bellows-like formation, outwardly flared holding element means, forcefit into the container body, for securing the mounting element to the container body despite dimensional variations in the container body arising from manufacturing tolerances, and a flexible partition which is connected to the first portion of the mounting element only along a relatively short peripheral section and which along the remainder of its periphery is connected to the second portion of the mounting element, the partition having at least one peripheral valve slit which under pressure loading of the partition from the side of the storage chamber opens against a restoring force exerted by the mounting element means and which upon relief from pressure automatically closes again under the restoring force, each said at least one peripheral valve slit being disposed only in the region of connection between the partition and the first portion of the mounting element, the partition being isolated from stress between the container body and the holding element means by the mounting element.

45. A valve member for insertion into a container having a flexible tubular wall and having a discharge opening to emit material stored in the container when the tubular wall is squeezed, the container additionally having a shoulder region adjacent the discharge opening, said member comprising:
 a unitary plastic dividing element which includes
  an annular holding flange having first and second ends and an outer surface between the first and seconds ends, the first end of the holding flange being disposed adjacent the shoulder region and the outer surface of the holding flange being pressed against the tubular wall of the container when the valve member is inserted into the container,
  a tubular mounting portion having first and second ends, the mounting portion being disposed within the holding flange with the first end of the mounting portion being oriented toward the first end of the holding flange and with the second end of the mounting portion being oriented toward the second end of the holding flange,
  first means, sealingly connecting the first ends of the mounting portion and holding flange, for mounting the mounting portion at a position spaced apart from the holding flange, there being an annular recess between the mounting portion and the holding flange,
  a flexible partition having a periphery and at least one slit adjacent the periphery, and
  second means for sealingly connecting the periphery of the partition to the second end of the mounting portion.

46. The valve member of claim 45, wherein the partition is circular and has a centre, and wherein each at least one slit is arcuate and is disposed on a circle about the same centre.

47. The valve member of claim 45, wherein the dividing element has an axis which runs through the partition, and wherein the distance between the axis and the outer surface of the holding flange at the first end thereof is less than the distance between the axis and the holding flange at the second end thereof.

48. The valve member of claim 47, wherein the first means comprises an annular portion which connects the first ends of the holding flange and mounting portion, the annular portion having an annular indentation which provides a weakened zone.

49. The valve member of claim 45, wherein said second means comprises an eccentric bellows-like formation having a widest portion, and wherein there is one slit which is disposed opposite said widest portion.

* * * * *